(12) United States Patent
Yang et al.

(10) Patent No.: US 7,041,407 B2
(45) Date of Patent: May 9, 2006

(54) SEPARATOR PLATE STRUCTURE FOR FUEL CELL STACK

(75) Inventors: Jefferson Y S Yang, Orange, CA (US); Te-Chou Yang, Kaohsiung (TW); Mike Pen-Mu Kao, Anaheim, CA (US); Yao-Sheng Hsu, Taipei (TW); Yaw-Chung Cheng, Taipei (TW)

(73) Assignee: Asia Pacific Fuel Cell Technologies, Ltd., Taipei (TW)

( * ) Notice: Subject to any disclaimer, the term of this patent is extended or adjusted under 35 U.S.C. 154(b) by 363 days.

(21) Appl. No.: 10/437,034

(22) Filed: May 14, 2003

(65) Prior Publication Data

US 2003/0219643 A1 Nov. 27, 2003

(30) Foreign Application Priority Data

May 23, 2002 (TW) ............................... 91207468 U

(51) Int. Cl.
*H01M 8/02* (2006.01)
(52) U.S. Cl. ........................................... 429/26; 429/39
(58) Field of Classification Search .................. 429/26, 429/38, 39
See application file for complete search history.

(56) References Cited

U.S. PATENT DOCUMENTS

| 6,248,466 | B1 * | 6/2001 | Takahashi et al. ............ 429/38 |
| 6,884,536 | B1 * | 4/2005 | Hatoh et al. ............... 429/39 X |
| 6,893,759 | B1 * | 5/2005 | Ooma et al. ................... 429/26 |
| 2003/0228507 | A1 * | 12/2003 | Hsu et al. ...................... 429/26 |
| 2004/0209146 | A1 * | 10/2004 | Nishimura et al. ........ 429/38 X |

* cited by examiner

*Primary Examiner*—Stephen J. Kalafut
(74) *Attorney, Agent, or Firm*—Rosenberg, Klein & Lee

(57) ABSTRACT

A fuel cell stack includes a number of modularized plate structures including an anode plate, a cathode plate, water coolant plates and air coolant plates. The anode and cathode plates are designed to form hydrogen and air channels that allow for uniform distribution and even flow of hydrogen and air through the channels with the channels of each particular plate having substantially identical length in order to enhance electrochemical reaction between hydrogen and oxygen contained in the air with respective catalysts in the fuel cell stack. Also a sufficient amount of air is allowed to flow through the cathode plate to enhance output power of the fuel cell stack. The coolant plates adapt a split design, which introduces turbulence in the coolant channels to enhance heat removal.

6 Claims, 6 Drawing Sheets

SEPARATOR PLATE STRUCTURE FOR FUEL CELL STACK

BACKGROUND OF THE INVENTION

1. Field of the Invention

The present invention relates generally to the field of fuel cells, and in particular to a modularized separate plate structure for forming a fuel cell stack.

2. Description of the Prior Art

Fuel cell power system is capable of generating electrical power energy by means of electrochemical reaction between a fuel, such as hydrogen and methanol, and an oxidizer, such as oxygen. The fuel cell is classified, based on the electrolyte thereof, as proton exchange membrane fuel cell or polymer electrolyte membrane fuel cell, abbreviated as PEMFC or PEM, alkaline fuel cell (AFC), phosphoric acid fuel cell (PAFC), molten carbonate fuel cell (MCFC) and solid oxide fuel cell (SOFC).

Among these known fuel cells, the PEMFC is the best-developed technique, having the advantages of low operation temperature, fast start-up and high power density. Thus, the PEMFC is very suitable for transportation vehicles and power generation systems, such as home power systems and other portable and stationary power generation systems.

The fuel cell generates electrical energy through electrochemical reaction of hydrogen and oxygen, with water as by-product. Basically, the electrochemical reaction occurred in the fuel cell stack is a reverse reaction of electrolysis of water, in which chemical energy is transferred into electrical energy. The fuel cell comprises anode and cathode plates separated from each other with electrolyte arranged between and in physical contact with both the anode and the cathode. A circuit 20 is also incorporated in the fuel cell for conduction of the electricity out of the fuel cell. A typical structure of the fuel cell is shown in FIG. 1 of the attached drawings, comprising an anode plate 10 and a cathode plate 14 opposite to and spaced from each other with electrolyte 18 provided therebetween. A catalyst 12 is provided at the anode plate 10. When hydrogen is conducted to the anode plate 10 and catalyzed by the catalyst 12 the following reaction is carried out at the anode:

The hydrogen ions produced at the anode 10 migrate through the electrolyte 18 and reach the cathode plate 14. Meanwhile, oxygen is conducted to the cathode 14 in which a catalyst 16 is provided. With the catalysis of the catalyst 16, oxygen undergoes the following reaction with hydrogen ions at the cathode:

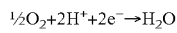

with water as reaction product.

Besides water, the electrochemical reaction also generates heat. To prevent the fuel cell from overheating and maintain it at high performance, a cooling means is commonly employed in the modularized fuel cell stack in order to properly and timely remove heat from the fuel cell stack. An example of the cooling means is a cooling plate structure that is incorporated in a fuel cell to remove heat therefrom. Water, air and the likes can be employed as coolant that circulates through the cooling plate for heat removal.

To optimize the operation efficiency of a particular fuel cell, the anode plate and the cathode plate, as well as the cooling plate, must be configured so that gases, including hydrogen, oxygen and air, are allowed to flow through the plates in a substantially uniform manner. In designing the plates, the following factors are critical and should be considered: (1) the uniform flowing of gases through all the channels formed inside each plate, (2) the consistency of the length of channels for even distribution of gases, (3) the maximal and uniform contact of gases with the catalysts in each channel for undergoing electrochemical reaction in the channel and (4) the flow rates of gases for maintaining the electrochemical reaction that is sufficient to supply the desired amount of electricity. Besides, in case of the cooling plate, sufficiency and efficiency in removing heat is another factor to be taken into account.

SUMMARY OF THE INVENTION

Thus, an object of the present invention is to provide a fuel cell stack comprising modularized stackable plates, including an anode plate, a cathode plate, an air cooling plate and a water cooling plate, those plate having a structure that allows gases to evenly flow through each channel of the plates, that forms channels for gas flow having substantially identical length, that allows for uniform reaction induced in each channel and that allows for sufficient flow rates for gases in the plates, as well as that allows for sufficient and efficient removal of heat from the fuel cell stack.

To achieve the above object, in accordance with the present invention, there is provided a fuel cell stack comprising modularized electrode plates, including an anode plate and a cathode plate, having a structure that allows hydrogen and oxygen to flow through channels formed therein. The channels have substantially the same length, so that hydrogen and oxygen can flow and be distributed evenly in each channel and undergo reaction with the catalysts in the channels. Meanwhile, sufficient hydrogen and oxygen are provided to generate enhanced output power. The fuel cell stack selectively comprises air cooling plate and water cooling plate having a structure that creates turbulent flow of air and water in order to efficiently remove heat from the fuel cell stack.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
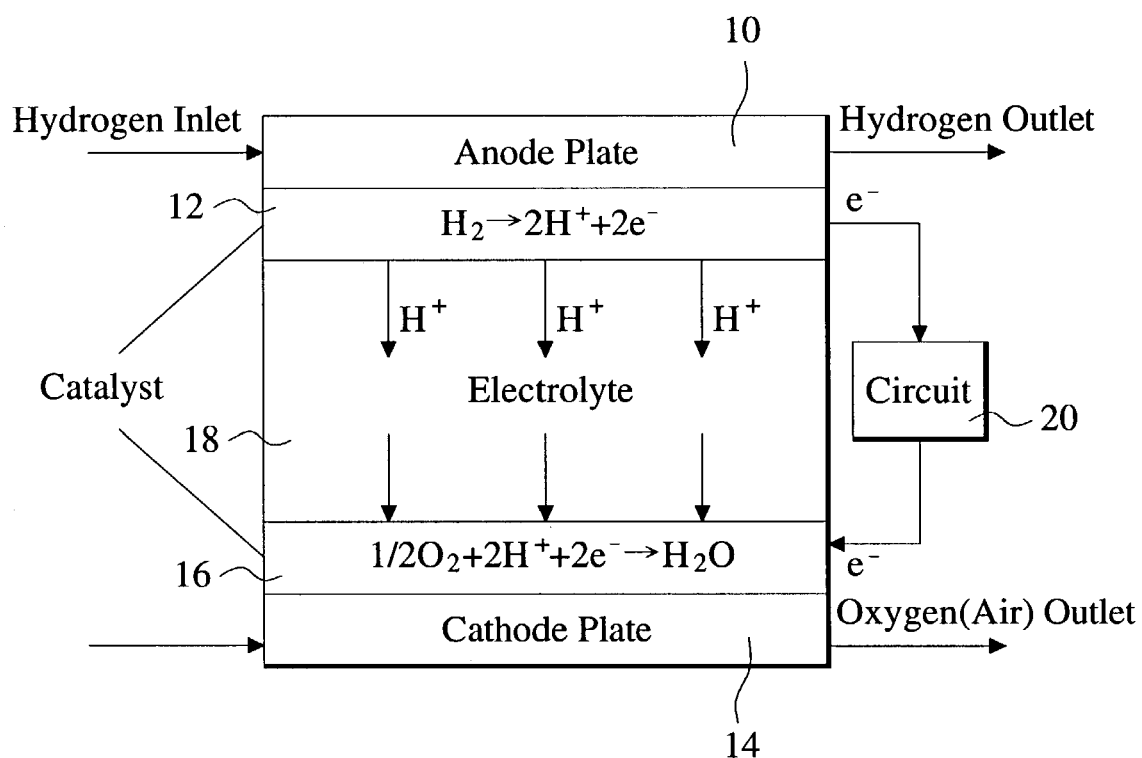
FIG. 1 is a schematic view of a typical fuel cell.
Figure 2:
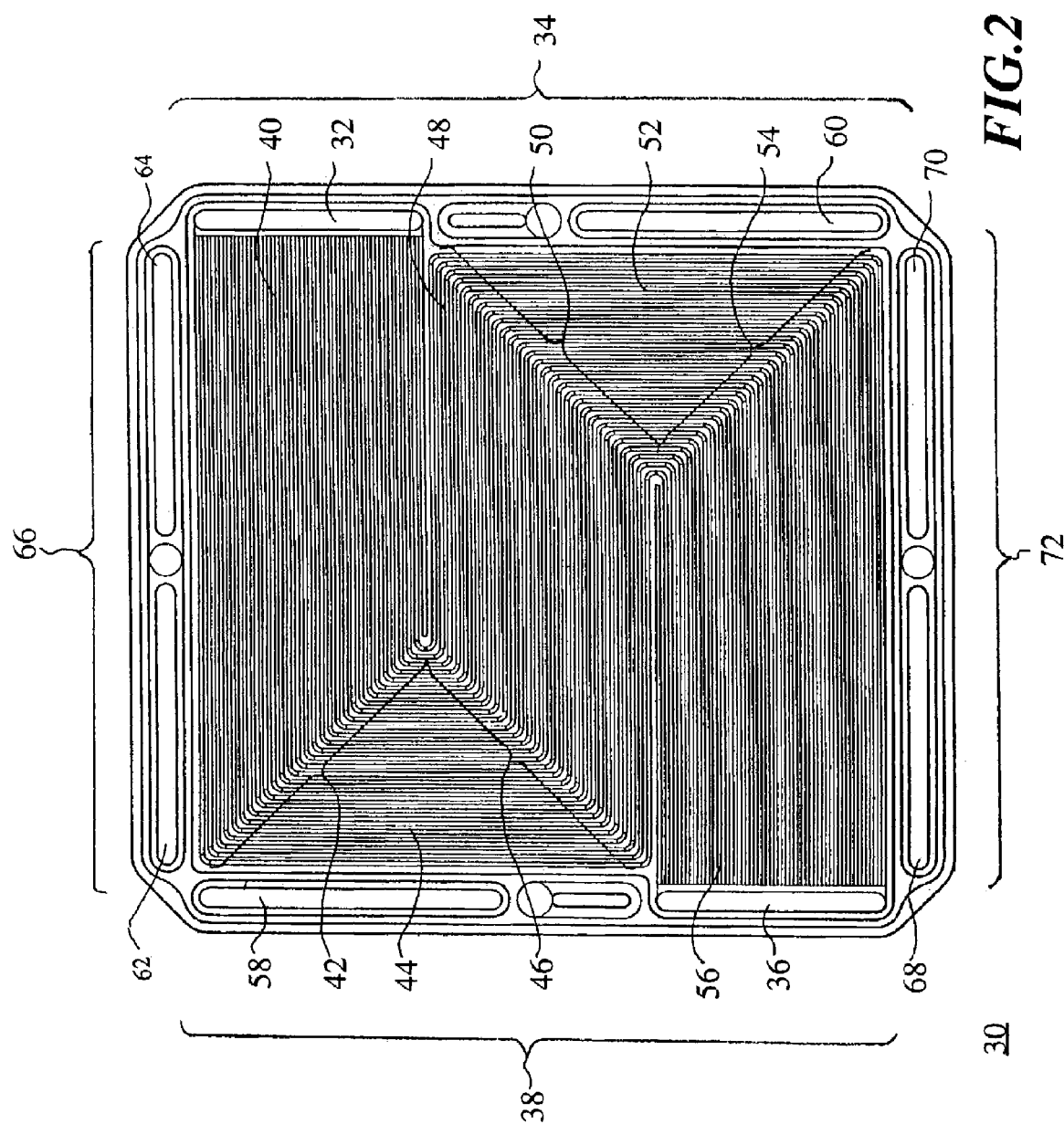
FIG. 2 is a plan view of an anode plate for a fuel cell stack constructed in accordance with the present invention.

With reference to the drawings and in particular to FIG. 2, in which an anode plate constructed in accordance with the present invention to be incorporated in a fuel cell stack is shown, the anode plate that is generally designated with reference numeral 30 in the drawings comprises a substantially rectangular structure having a second edge 38, a first edge 34 opposite to the second edge 38, a third edge 66 and a fourth edge 72 opposite to the third edge 66, the edges 34, 38, 66, 72 being connected to each other to form the rectangle. Along the first edge 34 of the anode plate 30, a hydrogen inlet port 32 in the form of an elongated slot having rounded ends is defined in a first half of the first edge 34. A hydrogen outlet port 36, also in the form of an elongate slot with rounded ends, is defined in a second half of the second edge 38 whereby the hydrogen inlet and outlet ports 32, 36 are substantially opposite to each other in a diagonal direction of the rectangular plate 30.

Hydrogen channels (not labeled) are formed in a first guide zone 40 of the anode plate 30 and are connected to and in fluid communication with the hydrogen inlet port 32. The hydrogen channels in the first guide zone 40 are arranged to be substantially parallel to each other and normal to the length of the hydrogen inlet port 32. In other words, the hydrogen channels in the first guide zone 40 are parallel to the third and the fourth edges 66, 72 and perpendicular to the first and second edges 34, 38.

Each hydrogen channel forms a first arcuate connection 42 which redirects the hydrogen channel to a direction substantially normal to that of the hydrogen channel in the first guide zone 40. Thus, the hydrogen channels are extended in a second guide zone 44 of the anode plate 30 in a direction normal to the third and fourth edges 66, 72 and parallel to the first and second edges 34, 38. The arcuate connection 42 is configured to smoothen flowing of gas therethrough and between sections of the hydrogen channels in the guide zones 40, 44. The hydrogen channels in the second guide zone 44 are substantially parallel to each other and the length of the hydrogen inlet port 32.

Each hydrogen channel forms a second arcuate connection 46, opposite to the first arcuate connection 42, which redirects the hydrogen channel to a direction substantially normal to that of the hydrogen channel in the second guide zone 44. Thus, the hydrogen channels are extended in a third guide zone 48 of the anode plate 30 in a direction parallel to the third and fourth edges 66, 72 and normal to the first and second edges 34, 38. The second arcuate connection 46 is configured to smoothen flowing of gas therethrough and between sections of the hydrogen channels in the guide zones 44, 48. The hydrogen channels are substantially parallel to each other in the third guide zone 48 and normal to the length of the hydrogen inlet port 32.

Each hydrogen channel forms a third arcuate connection 50, opposite to the second arcuate connection 46, which redirects the hydrogen channel to a direction substantially normal to that of the hydrogen channel in the third guide zone 48. Thus, the hydrogen channels are extended in a fourth guide zone 52 of the anode plate 30 in a direction normal to the third and fourth edges 66, 72 and parallel to the first and second edges 34, 38. The arcuate connection 50 is configured to smoothen flowing of gas therethrough and between sections of the channels in the guide zones 48, 52. The hydrogen channels in the fourth guide zone 52 are substantially parallel to each other and the length of the hydrogen inlet port 32.

Each hydrogen channel forms a fourth arcuate connection 54, opposite to the third arcuate connection 50, which redirects the hydrogen channel to a direction substantially normal to that of the hydrogen channel in the fourth guide zone 52. Thus, the hydrogen channels are extended in a fifth guide zone 56 of the anode plate 30 in a direction parallel to the third and fourth edges 66, 72 and normal to the first and second edges 34, 38. The fourth arcuate connection 54 is configured to smoothen flowing of gas therethrough and between sections of the hydrogen channels in the guide zones 52, 56. The hydrogen channels are substantially parallel to each other in the fifth guide zone 56 and normal to the length of the hydrogen inlet port 32 and are connected to and in fluid communication with the hydrogen outlet port 36. Thus, the hydrogen channels are connected between the hydrogen inlet and outlet ports 32, 36 and have an S-shaped configuration in the anode plate 30, including sections in the guide zones 40, 44, 48, 52, 56. Unreacted hydrogen in the fuel cell stack is discharged through the hydrogen outlet port 36.

Such a structure of anode plate 30 allows for hydrogen to be evenly distributed in the channels and uniformly flow through all the hydrogen channels between the hydrogen inlet and outlet ports 32, 36. Each hydrogen channel including sections in the guide zones 40, 44, 48, 52, 56 has substantially identical length. Uniform reaction between the hydrogen flowing through each hydrogen channel and the catalyst is performed. The S-shaped configuration of each hydrogen channel between the hydrogen inlet and outlet ports 32, 36, including the sections in the guide zones 40, 44, 48, 52, 56 maximize the overall length of the channels in the anode plate 30, which in turn brings the hydrogen with enhanced efficiency of reaction inside the fuel cell stack.

The anode plate 30 further comprises a coolant inlet port 58 that is defined in a first half of the second edge 38 of the anode plate 30. In other words, the coolant inlet port 58 is arranged above the hydrogen outlet port 36. The coolant that is used for cooling may be cooling water or air. A coolant outlet port 60 is defined in a second half of the first edge 34 of the anode plate 30, below the hydrogen inlet port 32. The coolant, such as air and water, is allowed to discharge through the coolant output port 60. Both the coolant inlet and outlet ports 58 and 60 are elongate slots with rounded ends. The coolant inlet and outlet ports 58, 60 are not in fluid communication with the hydrogen channels of the anode plate 30.

The anode plate 30 also defines a plurality of air inlet ports 62, 64, in the form of elongate slot with rounded ends, along the third edge 66 of the anode plate 30. The air inlet ports 62, 64 are arranged end by end along the third edge 66. A plurality of air outlet ports 68, 70 are defined along the fourth edge 72. The air outlet ports 68, 70 are in the form of elongate slots having rounded ends and are arranged end by end along the fourth edge 72 of the anode plate 30. The air inlet and outlet ports 62, 64, 68, 70 are not in fluid communication with the hydrogen channels of the anode plate 30.

Figure 3:
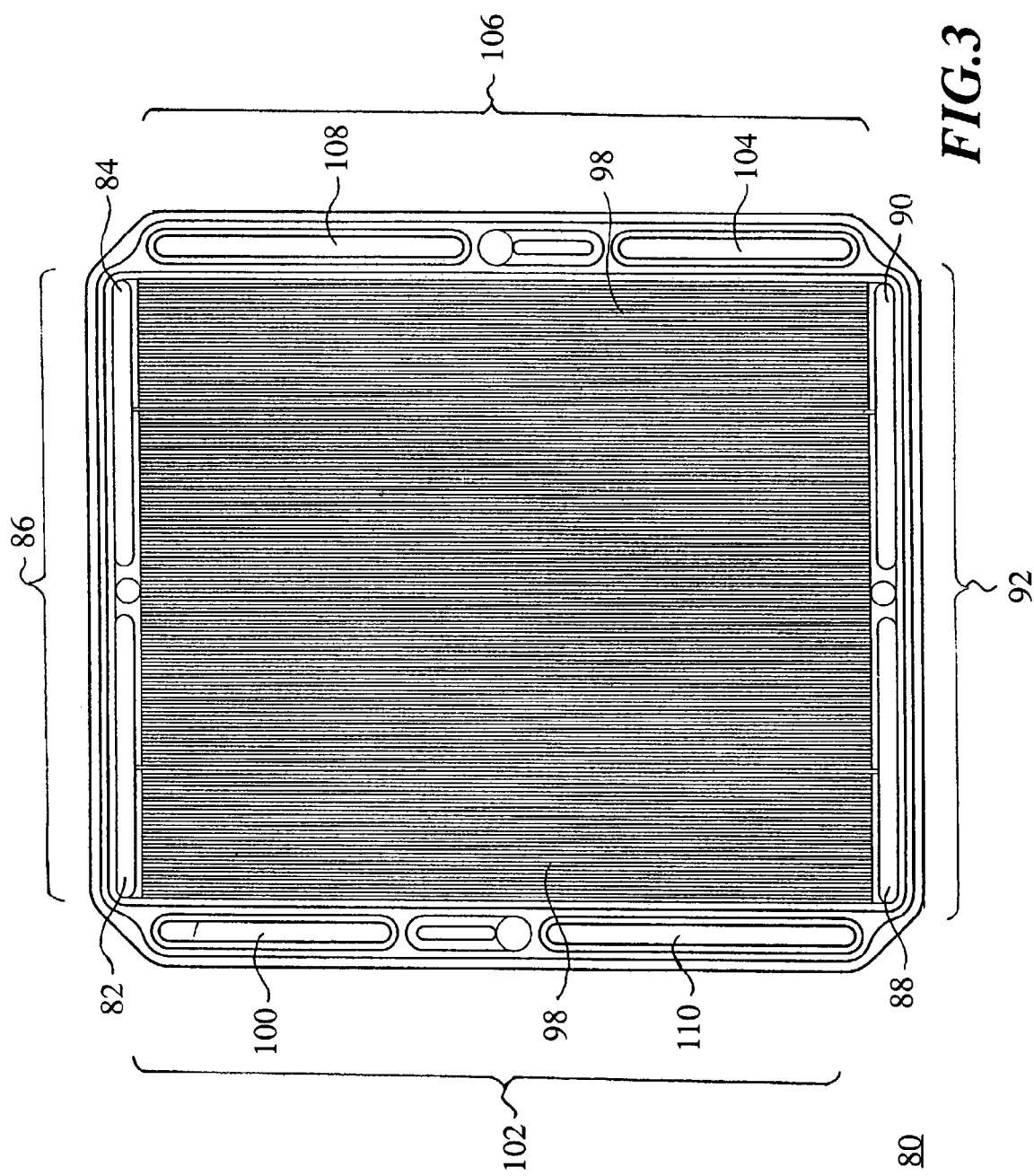
FIG. 3 is a plan view of a cathode plate for the fuel cell stack of the present invention.

FIG. 3 shows a plan view of a cathode plate constructed in accordance with the present invention to be incorporated in a fuel cell stack. The cathode plate that is broadly designated with reference numeral 80 comprises a substantially rectangular structure having a first edge 86 and a second edge 92 opposite to the first edge 86, a third edge 102, a fourth edge 106 opposite to the third edge 102, the edges 102, 106, 86, 92 being connected to each other to form the rectangle. Along the first edge 86 of the cathode plate 80, air inlet ports 82, 84 in the form of elongate slots having rounded ends are defined in an end by end manner. Air outlet ports 88, 90, also in the form of elongate slots with rounded ends, are defined in and along the second edge 92 in an end by end manner. Air channels (not labeled) are formed in a guide zone 98 of the cathode plate 80 and straightly extend between and in fluid communication with the air inlet and outlet ports 82, 84, 88, 90. The air channels run parallel to each other and the third and fourth edges 102, 106 and thus substantially perpendicular to length of the air inlet and outlet ports 82, 84, 88, 90. Air that contains oxygen for reaction with hydrogen in the fuel cell stack is allowed to enter the cathode plate 80 via the air inlet ports 82, 84, traveling through the air channels in a linear manner and finally leaves the cathode plate 80 via the air outlet ports 88, 90.

Such a structure of the cathode plate 80 allows the air to be evenly distributed in and uniformly flow through all the air channels between the air inlet and outlet ports 82, 84, 88, 90 for uniform reaction between the oxygen contained in the air flowing through each channel and the catalyst. The air inlet ports 82, 84 and the air outlet ports 88, 90 of the cathode plate 80, as well as the air channels in the guide zone 98 of the cathode plate 80, allows a sufficient amount of air to pass therethrough in order to meet the requirement of great consumption of oxygen in the chemical reaction occurring in the fuel cell stack. Thus, output power of the fuel cell stack is enhanced.

The cathode plate 80 forms a hydrogen inlet port 100, which is in the form of an elongate slot having rounded ends, in a first half of the third edge 102 and a hydrogen outlet port 104, which is also in the form of an elongate slot having rounded ends, in a second half of the fourth edge 106 whereby the hydrogen inlet and outlet ports 100, 104 are opposite to each other in a diagonal direction of the rectangle 80. The hydrogen inlet and outlet ports 100, 104 are not in fluid communication with the air channels.

The cathode plate 80 further defines a coolant inlet port 108 that is defined in a first half of the fourth edge 106 of the cathode plate 80. In other words, the coolant inlet port 108 is arranged above the hydrogen outlet port 104. A coolant outlet port 110 is defined in a second half of the third edge 102 of the cathode plate 80, below the hydrogen inlet port 100. Coolant, such as air and water, is allowed to circulate through the fuel cell stack by passing through the coolant inlet port 108 for flowing into the fuel cell stack and the coolant outlet port 110 for flowing out of the fuel cell stack. Both the coolant inlet and outlet ports 108, 110 are elongate slots with rounded ends and are not in fluid communication with the air channels of the cathode plate 80.

The anode plate 30 and the cathode plate 80 are stackable together as a dual-electrode plate in which the air inlet ports, air outlet ports, hydrogen inlet ports, hydrogen outlet ports, coolant inlet ports and coolant outlet ports are respectively connected together to allow air, hydrogen and coolant to flow in and out of the dual-electrical plate. However, the hydrogen channels formed in the anode plate 30 and the air channels formed in the cathode plate 80 are separated from each other. Thus, the oxygen contained in the air and the hydrogen should not get mixed randomly and instead they are involved in the reactions in the anode and the cathode respectively.

Figure 4:
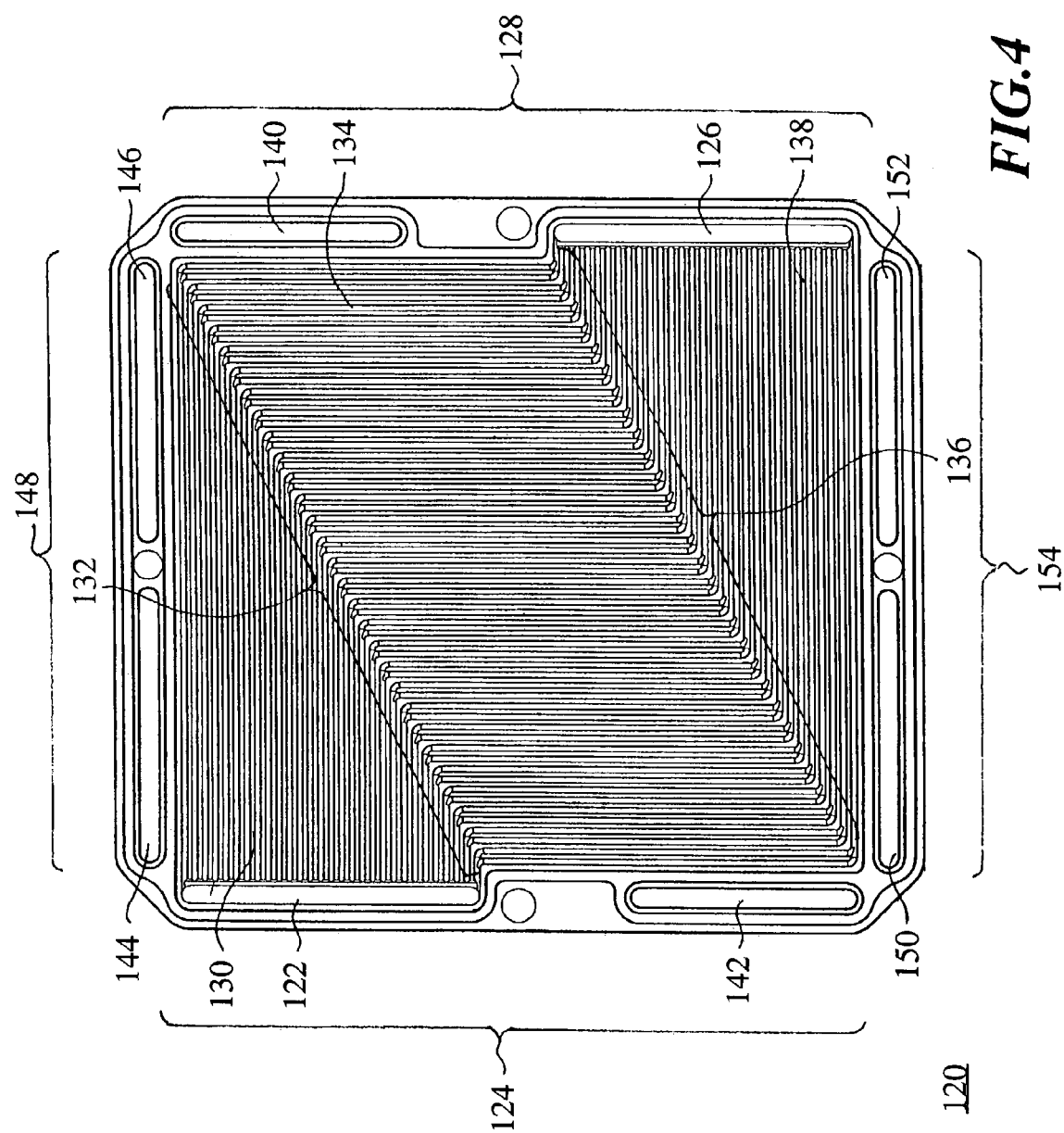
FIG. 4 is a plan view of a water cooling plate for the fuel cell stack of the present invention.

FIG. 4 shows an embodiment of a cooling plate constructed in accordance with the present invention in which water is adopted as coolant flowing through the coolant plate. The water cooling plate, which is broadly designated with reference numeral 120, comprises a substantially rectangular structure having a first edge 124, a second edge 128 opposite to the first edge 124, a third edge 148 and a fourth edge 154 opposite to the third edge 148, the edges 124, 128, 148, 154 being connected to each other to form the rectangle. Along the first edge 124 of the water cooling plate 120, a coolant water inlet port 122 in the form of an elongate slot having rounded ends is defined in a first half of the first edge 124. A coolant water outlet port 126, also in the form of an elongate slot with rounded ends, is defined in a second half of the second edge 128 whereby the coolant water inlet and outlet ports 122, 126 are substantially opposite to each other in a diagonal direction of the rectangular plate 120.

Coolant channels (not labeled) are formed in a first guide zone 130 of the coolant plate 120 and are connected to and in fluid communication with the coolant water inlet port 122. The coolant channels in the first guide zone 130 are arranged to be substantially parallel to each other and normal to the length of the coolant water inlet port 122. In other words, the coolant channels are parallel to the third and the fourth edges 148, 154 and perpendicular to the first and second edges 124, 128.

Each coolant channel forms a first arcuate connection 132 which redirects the coolant channel to a direction substantially normal to that of the coolant channel in the first guide zone 130 and splits the coolant channel into two parallel sub-channels in a second guide zone 134 in which the sub-channels are extended in a direction normal to the third and fourth edges 148, 154 and parallel to the second and first edges 124, 128. The arcuate connection 132 is configured to smoothen the flowing of coolant therethrough and between sections of the coolant channels in the guide zones 130, 134. The sub-channels in the second guide zone 134 are substantially parallel to each other and the length of the coolant water inlet port 122.

Each coolant channel forms a second arcuate connection 136, opposite to the first arcuate connection 132, which redirects the sub-channels of the coolant channel in the second guide zone 134 to a direction substantially normal to that of the sub-channels and joint the sub-channels to a single coolant channel in a third guide zone 138 in which the channel is extended in a direction parallel to the third and fourth edges 148, 154 and normal to the second and first edges 128, 124. The second arcuate connection 136 is configured to smoothen the flowing of coolant therethrough and between sections of the channels in the guide zones 134, 138. The coolant channels in the third guide zone 138 are substantially parallel to each other and normal to the length of the coolant water inlet port 122. The coolant channels are connected to and in fluid communication with the coolant water outlet port 126 whereby coolant water that flows into the cooling plate 120 via the coolant water inlet port 122 flows through sections of the coolant channels in the guide zones 130, 134, 138 toward the coolant water outlet port 126 for bringing away heat generated during the operation of the fuel cell stack.

Each coolant channel is split into two or even more sub-channels in the second guide zone 134 of the coolant plate 120. This introduces turbulence in the coolant flow for enhancing heat removal from the fuel cell stack.

The cooling plate 120 further defines a hydrogen inlet port 140 in the form of an elongate slot having rounded ends that is formed in a first half of the second edge 128 of the coolant plate 120 and is thus located above the coolant water outlet port 126. A hydrogen outlet port 142, also in the form of an elongate slot having rounded ends, is defined in a second half of the first edge 124 of the coolant plate 120, below the coolant water inlet port 122. Both the hydrogen inlet and outlet ports 140 and 142 are not in fluid communication with the coolant channels of the cooling plate 120. Air inlet ports 144, 146, in the form of elongate slots having rounded ends, are defined along the third edge 148 and arranged in an end by end manner, while air outlet ports 150, 152, in the form of elongate slots having rounded ends, are defined along the fourth edge 154 and also arranged in an end by end manner.

The air inlet and outlet ports 144, 146, 150, 152 are not in fluid communication with the coolant channels of the cooling plate 120.

The cooling plate 120 and the anode plate 30 are stackable together as a composite anode structure having individual cooling means in which the air inlet ports, air outlet ports, hydrogen inlet ports, hydrogen outlet ports, coolant inlet ports and coolant outlet ports are respectively connected together to allow air, hydrogen and coolant to flow in and out of the composite anode structure.

Similarly, the cooling plate 120 and the cathode plate 80 are stackable together as a composite cathode structure having individual cooling means in which the air inlet ports, air outlet ports, hydrogen inlet ports, hydrogen outlet ports, coolant inlet ports and coolant outlet ports are respectively connected together to allow air, hydrogen and coolant to flow in and out of the composite cathode structure.

Figure 5:
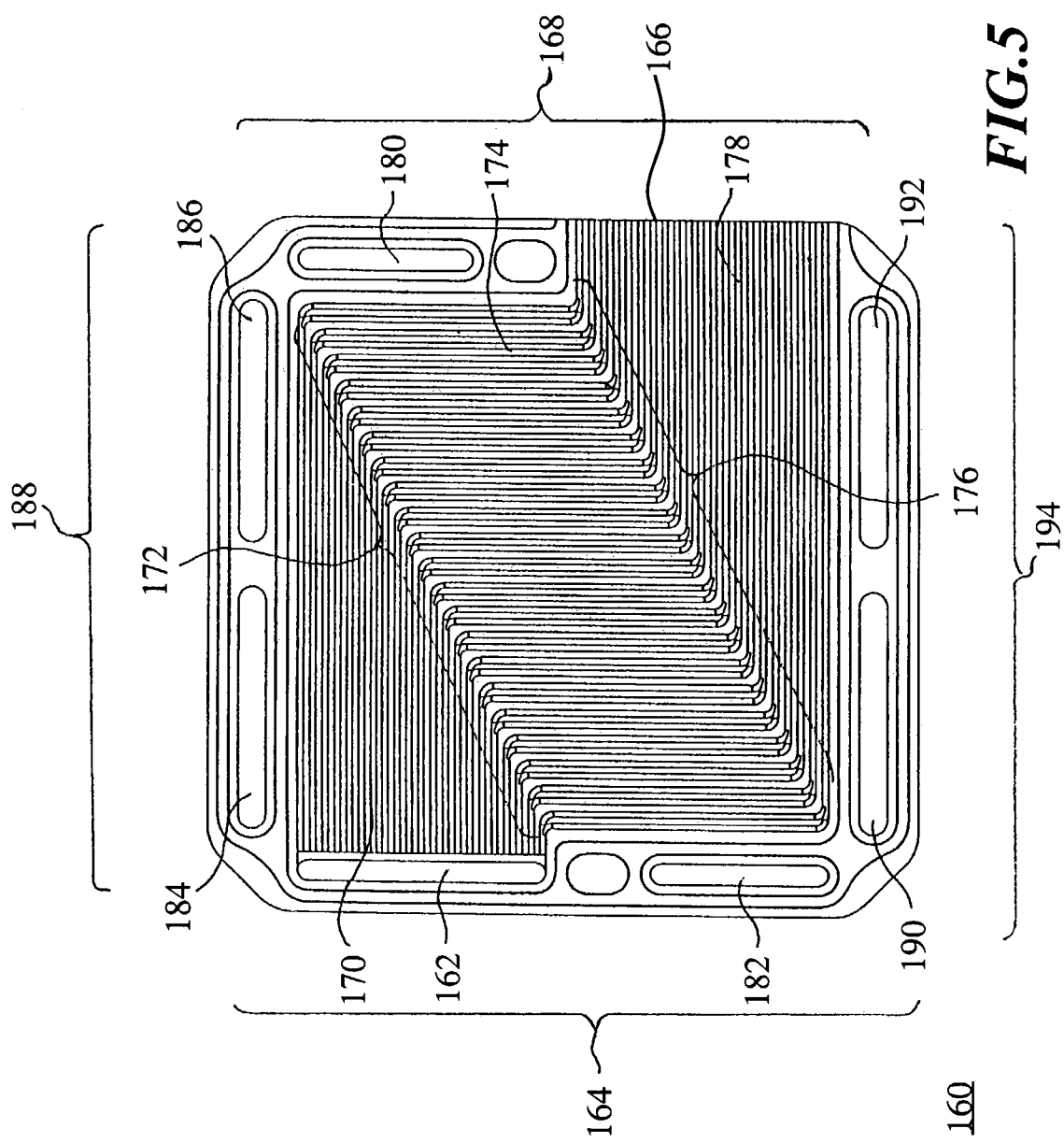
FIG. 5 is a plan view of an air cooling plate for the fuel cell stack of the present invention.

FIG. 5 shows another embodiment of the cooling plate constructed in accordance with the present invention in which air is adopted as coolant flowing through the cooling plate. The cooling plate, which is broadly designated with reference numeral 160, comprises a substantially rectangular structure having a first edge 164, a second edge 168 opposite to the first edge 164, a third edge 188 and a fourth edge 194 opposite to the third edge 188, the edges 164, 168, 168, 194 being connected to each other to form the rectangle. Along the first edge 164 of the cooling plate 160, a coolant air inlet port 162 in the form of an elongate slot having rounded ends is defined in a first half of the first edge 164.

Air coolant channels (not labeled) are formed in a first guide zone 170 of the cooling plate 160 and are connected to and in fluid communication with the coolant air inlet port 162. The coolant channels in the first guide zone 170 are arranged to be substantially parallel to each other and normal to the length of the coolant air inlet port 162. In other words, the coolant channels are parallel to the third and the fourth edges 188, 194 and perpendicular to the first and second edges 164, 168.

Each coolant channel forms a first arcuate connection 172 which redirects the coolant channel to a direction substantially normal to that of the coolant channel in the first guide zone 170 and splits the coolant channel into two parallel sub-channels in a second guide zone 174 in which the sub-channels are extended in a direction normal to the third and fourth edges 188, 194 and parallel to the second and first edges 164, 168. The arcuate connection 172 is configured to smoothen the flowing of coolant therethrough and between sections of the coolant channels in the guide zones 170, 174. The sub-channels in the second guide zone 174 are substantially parallel to each other and the length of the coolant air inlet port 162.

Each coolant channel forms a second arcuate connection 176, opposite to the first arcuate connection 172, which redirects the sub-channels of the coolant channel in the second guide zone 174 to a direction substantially normal to that of the sub-channels and joint the sub-channels to a single coolant channel in a third guide zone 178 in which the channel is extended in a direction parallel to the third and fourth edges 188, 194 and normal to the second and first edges 168, 164. The second arcuate connection 176 is configured to smoothen the flowing of coolant flow therethrough and between sections of the channels in the guide zones 174, 178. The coolant channels in the third guide zone 178 are substantially parallel to each other and normal to the length of the coolant air inlet port 162. Each coolant channel has an end opening 166 at a second half of the second edge 168 to directly discharge the air into the surroundings.

Each coolant channel is split into two or even more sub-channels in the second guide zone 174 of the coolant plate 160. This introduces turbulence in the coolant flow for enhancing heat removal from the fuel cell stack.

The cooling plate 160 further defines a hydrogen inlet port 180 in the form of an elongate slot having rounded ends that is formed in a first half of the second edge 168 of the cooling plate 160 and is thus located above the coolant channel end openings 166. A hydrogen outlet port 182, also in the form of an elongate slot having rounded ends, is defined in a second half of first edge 164 of the cooling plate 160, below the coolant air inlet port 162. Both the hydrogen inlet and outlet ports 180 and 182 are not in fluid communication with the coolant channels of the coolant plate 160. Air inlet ports 184, 186, in the form of elongate slots having rounded ends, are defined along the third edge 188 and arranged in an end by end manner, while air outlet ports 190, 192, in the form of elongate slots having rounded ends, are defined along the fourth edge 194 and also arranged in an end by end manner. The air inlet and outlet ports 184, 186, 190, 192 are not in fluid communication with the coolant channels of the cooling plate 160.

The cooling plate 160 and the anode plate 30 are stackable together as a composite anode structure having individual cooling means in which the air inlet ports, air outlet ports, hydrogen inlet ports, hydrogen outlet ports, coolant inlet ports and coolant outlet ports are respectively connected together to allow air, hydrogen and coolant to flow in and out of the composite anode structure.

Similarly, the cooling plate 160 and the cathode plate 80 are stackable together as a composite cathode structure having individual cooling means in which the air inlet ports, air outlet ports, hydrogen inlet ports, hydrogen outlet ports, coolant inlet ports and coolant outlet ports are respectively connected together to allow air, hydrogen and coolant to flow in and out of the composite cathode structure.

Figure 6:
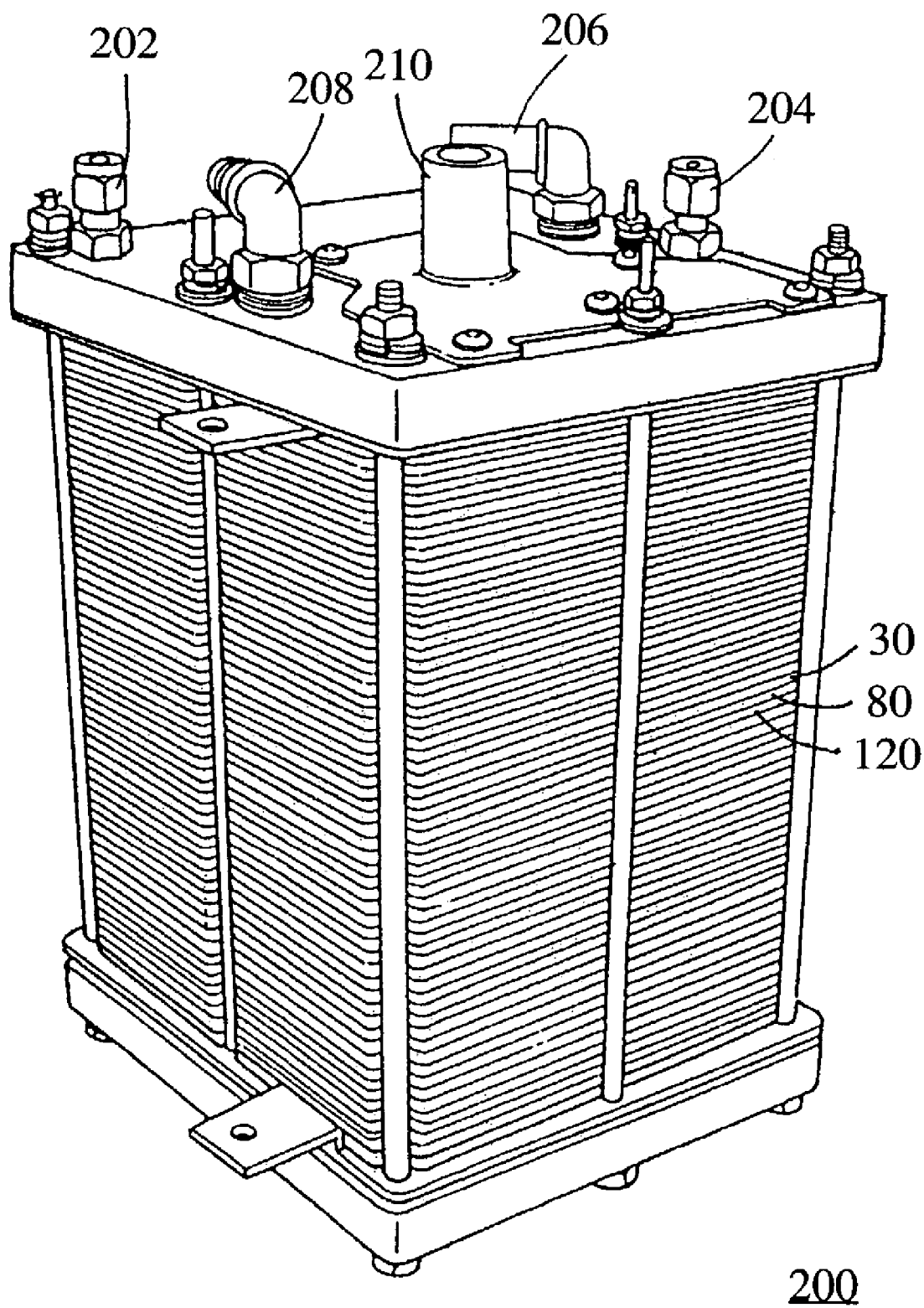
FIG. 6 is a perspective view of a fuel cell stack comprised of the anode plate, the cathode plate, and the water cooling plate in accordance with the present invention.

To this point, it is apparent that the present invention provides an anode plate, a cathode plate, a water cooling plate and an air cooling plate for forming a fuel cell stack. These plates are allowed to combined arbitrarily to form the fuel cell stack as shown in FIG. 6 wherein a fuel cell, designated with reference numeral 200, comprises an anode plate 30, a cathode plate 80 and a water cooling plate 120 stacked together. The fuel cell is provided with a main hydrogen inlet 202 and a main hydrogen outlet 204 which are connected to and in fluid communication with the hydrogen inlet and outlet ports formed in the plates 30, 80, 120 and the hydrogen channels defined in the anode plate 30 for circulating hydrogen through the fuel cell stack. The fuel cell is also provided with a main air inlet 210 which is connected to and in fluid communication with the air inlet and outlet ports formed in the plates 30, 80, 120 and the air channels defined in the cathode plate 80 for drawing and circulating air containing oxygen into and through the fuel cell stack. The air is eventually discharged out of the fuel cell via a main air outlet not shown in the drawing. In addition, a main coolant inlet 206 and a main coolant outlet 208 are formed on the fuel cell stack and are connected to and in fluid communication with the coolant inlet and outlet ports formed in the plates 30, 80, 120 and the coolant channels defined in the coolant plate 120 for circulating coolant through the fuel cell stack. It is noted that the cooling plate 120 may be replaced or additionally combined with the cooling plate 160 shown in FIG. 5.

It is apparent to those skilled in the art to add other components that are musts to the operation of the fuel cell or that enhances the operation efficiency and convenience to the fuel cell stack, such as proton exchange membrane, electric conducting plates or end plates.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A water coolant plate of a fuel cell stack comprising:
   a rectangular configuration having opposite first and second edges, each having first and second halves;
   a coolant inlet port in the form of elongate slot defined in the first half of the first edge;
   a plurality of coolant channels formed in the rectangle and connected to the coolant inlet port, each coolant channel comprising:
      a first section arranged in a first guide zone of the rectangle and in fluid communication with the coolant inlet port, the first sections extending from the coolant inlet port and substantially parallel to each other and thus substantially perpendicular to the length of the coolant inlet port,
      a plurality of second sections arranged in a second guide zone of the rectangle and substantially parallel to each other, the second sections being jointly connected to the first section in a substantially perpendicular manner by a first arcuate connection, the second sections of each coolant channel being substantially parallel to each other and parallel to the length of the coolant inlet port, and
      a third section arranged in a third guide zone of the rectangle with the plurality of the second sections jointly connected thereto in a substantially perpendicular manner by a second arcuate connection, the third sections being substantially parallel to each other and perpendicular to the length of the coolant inlet port; and
   a coolant outlet port in the form of elongate slot defined in the second half of the second edge and connected to and in fluid communication with the third sections of the coolant channels;
   wherein coolant water enters the coolant plate via the coolant inlet port, travels through the coolant channels and leaves the coolant plate via the coolant outlet port, each channel being split into a plurality of second sections in the second zone for introducing turbulence of the coolant water flow through the coolant channel to enhance heat removal.

2. The water coolant plate as claimed in claim 1 further comprising a hydrogen inlet port and a hydrogen outlet port, both in the form of elongate slots, the hydrogen inlet port being defined in the first half of the second edge, the hydrogen outlet port being defined in the second half of the first edge, the hydrogen inlet port and the hydrogen outlet port being not in fluid communication with the coolant channels.

3. The water coolant plate as claimed in claim 1 further comprising a plurality of air inlet ports in the form of elongate slots defined in a third edge of the rectangle and arranged in an end by end manner along the third edge, and a plurality of air outlet ports in the form of elongate slots defined in a fourth edge of the rectangle and arranged in an end by end maimer along the fourth edge, the air inlet and outlet ports being not in fluid communication with the coolant channels.

4. An air coolant plate of a fuel cell stack comprising:
   a rectangular configuration having opposite first and second edges, each having first and second halves;
   a coolant inlet port in the form of elongate slot defined in the first half of the first edge; and
   a plurality of coolant channels formed in the rectangle and connected to the coolant inlet port, each coolant channel comprising:
      a first section arranged in a first guide zone of the rectangle and in fluid communication with the coolant inlet port, the first sections extending from the coolant inlet port and substantially parallel to each other and thus substantially perpendicular to the length of the coolant inlet port,
      a plurality of second sections arranged in a second guide zone of the rectangle and substantially parallel to each other, the second sections being jointly connected to the first section in a substantially perpendicular manner by a first arcuate connection, the second sections of each coolant channel being substantially parallel to each other and parallel to the length of the coolant inlet port, and
      a third section arranged in a third guide zone of the rectangle with the plurality of the second sections jointly connected thereto in a substantially perpendicular manner by a second arcuate connection, the third sections being substantially parallel to each other and perpendicular to the length of the coolant inlet port, each third section forming an end opening at the second half of the second edge;
   wherein coolant air enters the coolant plate via the coolant inlet port, travels through the coolant channels and leaves the coolant plate via the end openings of the third sections of the coolant channel, each coolant channel being split into a plurality of second sections in the second zone for introducing turbulence of the coolant air flow though the coolant channel to enhance heat removal.

5. The air coolant plate as claimed in claim 4 further comprising a hydrogen inlet port and a hydrogen outlet port, both in the form of elongate slots, the hydrogen inlet port being defined in the first half of the second edge, the hydrogen outlet port being defined in the second half of the first edge, the hydrogen inlet port and the hydrogen outlet port being not in fluid communication with the coolant channels.

6. The air coolant plate as claimed in claim 4 further comprising a plurality of air inlet ports in the form of elongate slots defined in a third edge of the rectangle and arranged in an end by end manner along the third edge, and a plurality of air outlet ports in the form of elongate slots having rounded ends defined in a fourth edge of the rectangle and arranged in an end by end manner along the fourth edge, the air inlet and outlet ports being not in fluid communication with the coolant channels.

* * * * *